Dec. 17, 1968          R. E. ERON          3,416,266
POLY-SONIC MECHANICAL PEST DETERRENT
Filed Sept. 8, 1964
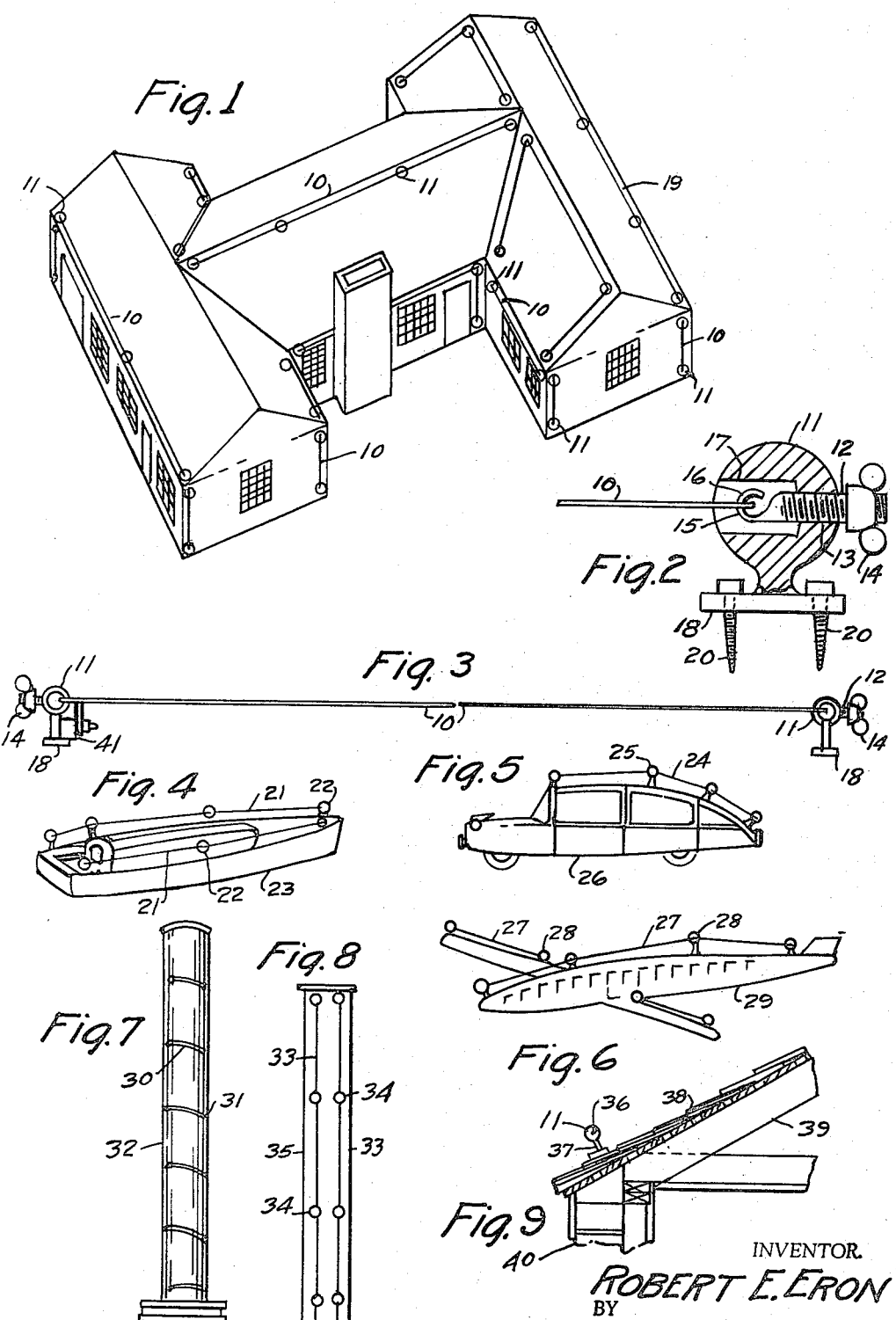
INVENTOR.
ROBERT E. ERON
BY
James Harrison Bowen
ATTORNEY

United States Patent Office 3,416,266
Patented Dec. 17, 1968

3,416,266
POLY-SONIC MECHANICAL PEST DETERRENT
Robert E. Eron, 1439 5th Ave. N.,
St. Petersburg, Fla. 33705
Filed Sept. 8, 1964, Ser. No. 394,769
1 Claim. (Cl. 52—101)

ABSTRACT OF THE DISCLOSURE

This invention relates to a pest exterminator to repel or scare birds away from a structure such as a house, a boat, a vehicle, a column and for the like structures, and consisting of a wire or single strand, means being provided to vary tension in the wire, and additional means to readily mount the wire on the structure and readily dismount it and adjust it in other locations, further means being provided to cause mechanical vibrations in the wire.

---

The present invention relates to pest control and extermination, and in particular the deterring of birds, such as pigeons and the like, from roosting on eaves or roofs of buildings, or other structures, or vehicles where droppings of the birds in window and door openings or over the surface of a building is objectionable.

The purpose of this invention is to provide means for preventing birds and the like roosting on and around buildings and other structures, vehicles, statues, and other equipment wherein droppings from the birds is objectionable.

Various types of insecticides and other odor and noise producing sprays and machines have been used on buildings, trees, vehicles and the like. However, birds soon become acclimated to odor creating or noise, or vibration producing machines and consequently the lives of such devices are relatively short.

With this thought in mind this invention contemplates a wire or strand of plastic or other material, or the like stretched between two points or retained in tension by other means, and means for mounting the wire along the edge of a roof of a building, or other structure, cabin of a boat, fuselage of aircraft, or body or roof of a vehicle, and in numerous other positions, where a slight breeze blowing over the wire causes it to vibrate. This vibration apparently sets up a field, or aura, in the vicinity of the wire. Whether this field is an intensification of the natural magnetic field about a tensioned strand, or is a supersonic zone, or is some interrelating combination of both, is not entirely understood. What is clear is that the field scares birds, pigeons, and other pests to such an extent that they will not land anywhere in the vicinity of the strand.

The object of this invention is, therefore, to provide means for deterring birds and particularly pigeons from resting on parts of buildings, or other structures, vehicles, and the like.

Another object of the invention is to provide a pest control or eliminator including a wire having tension therein in which means is provided for adjusting tension in the wire.

Another important object of the invention is to provide means for creating an area in which birds will not remain and in which vibrations and noise exist.

A further object of the invention is to provide a wire or the like for creating vibrations and noise in which the parts may be installed by the average layman.

A still further object is to provide means for generating sound and vibrations in which said sound and vibrations are created without electricity.

And a still further object is to provide apparatus for scaring birds, pests, and the like from an area in which the apparatus is of simple and economical construction.

Other and further objects and advantages of the present invention will be apparent from the following detailed description, drawings and claims, the scope of the invention not being limited to the illustrations of the drawings as the drawings are only for the purpose of illustrating a method by which the principles of this invention can be applied.

Other embodiments of the invention utilizing the same or equivalent principles may be used and structural changes may be made as desired by those skilled in the art without departing from the present invention and the purview of the appended claims.

With these and other objects and advantages in view the invention embodies a wire, or strand of material designed to be mounted on and spaced from the edge of a roof, or other building structure, vehicle, or machine whereby with the strand held in tension even a slight wind passing over the strand produces vibrations or sound.

Other features and advantages of the invention will appear from the following description taken in connection with the drawings, wherein:

FIGURE 1 is a view showing a building having wires or other strands for producing vibrations positioned on corners or edges thereof.

FIGURE 2 is a view showing an adjustable tension mounting for installing wires, and the like on a building structure, or the like.

FIGURE 3 is a view showing a wire or other strand of material stretched between mounting elements such as used on a building or other structure.

FIGURE 4 is a view showing a wire or a strand of material mounted in tension on a boat.

FIGURE 5 is a view showing a similar wire or strand of material on a motor vehicle.

FIGURE 6 is a view showing a wire or strand of other material mounted in tension on aircraft.

FIGURE 7 is a view showing wires or strands of material on the outer surface of a tower.

FIGURE 8 is a view similar to that shown in FIGURE 7 showing the wires or strands vertically or longitudinally positioned.

FIGURE 9 is a view showing a section through the lower edge of a roof of a building illustrating a typical mounting of a wire or other strand of material on a roof.

While one embodiment of the invention is illustrated in the above-referred-to drawing, it is to be understood that it is merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawing, and in the following specification, the same reference characters are used to designate the same parts and elements throughout and in which the numeral 10 refers to a wire, strand of material, or the like, which is mounted in knobs 11 by adjusting screws 12 threaded in openings 13 and provided with wing nuts 14. The inner ends of the adjusting screws are provided with hooks 15 over which loops 16 on the ends of the wire 10 are positioned as shown in FIGURE 3. The hooks and loops are positioned in cavities 17 in the sides of the knobs and the knobs are provided with flanges 18 by which the knobs are mounted on roofs 19, and the like. The knobs and flanges are secured by lag screws 20.

With the wires or strands secured to and spaced from the exterior surface of roofs, walls, window and door frames, and the like, tension in the wires or strands may be adjusted by turning the adjusting screws 12 and, furthermore, the positions of the wires or strands are adjustable in relation to the edge of a roof, or window, or door frame by removing the lag screws and placing them in different positions.

It will be understood that the strands of material, wires, or the like, may be of light or heavy gage and such wires may be used on different structures, machines, or other equipment.

Several such applications are illustrated in FIGURES 4, 5, 6, 7, and 8 wherein, in FIGURE 4 wires 21 are mounted by knobs 22 on a boat 23; in FIGURE 5 wires or strands or other materials 24 are mounted by knobs 25 on the outer surface of the body of a motor vehicle 26; and in FIGURE 6 wires or strands 27 are secured by knobs 28 on an aircraft 29.

In FIGURE 7 small arcuate bars 30 are mounted by knobs 31 on the outer surface of a tower 32 and in FIGURE 8 wires or strands 33 are supported by knobs 34 on the outer surface of a tower or stack 35. In this design the wires or strands are positioned longitudinally of the stack.

In the design shown in FIGURE 9 wires or strands 36 are supported by knobs or posts 37 on shingles 38 of a roof 39 of a building 40. It will be understood that the wire or strand may be used on a roof of any type or description and the roof may provide a cover for substantially any type of building, structure, vehicle, or object.

Although the pest deterrent device is particularly designed for preventing pigeons, sparrows and other birds gathering on roofs of buildings and other structures, in window, door and other openings in walls of buildings and in parks, the wire, strand or the like, under tension may also be used to protect vehicles, machinery, tools and other equipment which provides shelters for birds, rodents, animals and other pests.

The wire or strand may be made of metal, plastic or other material; and the tension may be adjusted by the wing nuts 14 or by other means.

The wires, strands or the like, may also run transversely as shown in FIGURE 7, longitudinally as shown in FIGURE 8 or in any suitable direction. The wires or strands may also be mounted by other means.

With the wire under tension wind even at low velocity, passing over the wire causes the wire to vibrate.

The unit or installation may also be provided with a mechanical vibrator 41, as shown in FIGURE 3 if desired, and as many vibrators, wires, or strands may be used as may be desired.

From the foregoing description, it is thought to be obvious that a pest deterrent device constructed in accordance with this invention is particularly well adapted for use, by reason of the convenience and facility with which it may be installed, and it will also be obvious that the invention is susceptible of some change and modification without departing from the principles and spirit thereof, and for this reason it is not desired to be limited to the precise arrangement and formation of the several parts herein shown in carrying out the invention in practice, except as claimed.

What is claimed is:
1. A device for deterring pests away from a structure, said device comprising:
   (a) a single strand of material,
   (b) support means mounted on said structure and supporting said strand spaced from the exterior of said structure,
   (c) mechanical vibrator means associated with said strand for imparting vibrations thereto, and adjustable tension means associated with said support means for imparting and maintaining a tension in said strand for regulating the effect produced by said vibrator means to produce a field in the vicinity of said strand abhorrent to pests whereby to deter them away from said structure.

References Cited
UNITED STATES PATENTS

| | | | |
|---|---|---|---|
| 169,365 | 11/1875 | McClellan | 287—59 XR |
| 714,704 | 12/1902 | Jackson | 211—119.15 |
| 3,148,417 | 9/1964 | Bellas | 52—101 |

FRANK L. ABBOTT, *Primary Examiner.*

P. C. FAW, *Assistant Examiner.*

U.S. Cl. X.R.

52—25